Feb. 6, 1962  R. J. MELTZER  3,019,694
REFRACTOMETER
Filed July 3, 1959

INVENTOR.
ROBERT J. MELTZER
BY *Frank C. Parker*
ATTORNEY

United States Patent Office 3,019,694
Patented Feb. 6, 1962

3,019,694
REFRACTOMETER
Robert J. Meltzer, Irondequoit, N.Y., assignor to Bausch & Lomb Incorporated, a corporation of New York
Filed July 3, 1959, Ser. No. 824,829
7 Claims. (Cl. 88—14)

The present invention relates generally to refractometers and more particularly to refractometers suitable for measuring the amount of protein in serum samples.

The principal object of the present invention is to provide an improved refractometer of the Pulfrich type which is compact in design and neat in appearance.

Ordinarily, in serum protein meters, it is customary to provide an adjustable scale to indicate the amount of protein present in a sample of serum. The present refractometer includes a fixed reticle and utilizes means for moving the image formed by the refracted light rays in order to adjust the refractometer to the temperature conditions prevailing at the time the instrument is utilized.

It is a more specific object of the present invention to provide a refractometer having a reticle so calibrated that a sample of water, at the temperature of the serum sample to be examined, is first examined in order to calibrate the instrument and thereby compensate for the existing temperature conditions. Thereafter, the serum sample may be examined, it being assumed that the serum sample is at the same temperature as the water used to initially calibrate the refractometer. The protein present in the sample can thus be read directly from the reticle scale without intervening calculations to compensate for the actual temperature of the serum sample.

A further object of the present invention is to provide an improved serum protein meter wherein a novel means for mounting the refracting prism is utilized which facilitates the positioning of the prism between a light source and an optical system such that the essential elements are compactly grouped together to afford a more practical over-all design of the instrument. In the present refractometer the housing for the same is formed with an opening in the top. The refracting prism is provided with a cylindrically-shaped flat-topped button-like portion which projects through said opening and thereby enables the surrounding top portion of the prism to be cemented to the underside of the top of the refractometer housing. This facilitates assembly of the instrument and affords a unique means for mounting the refracting prism in the housing.

The foregoing objects and numerous advantages of the present invention will become apparent from the following detailed description, when read in conjunction with the accompanying drawing wherein.

Figure 3:
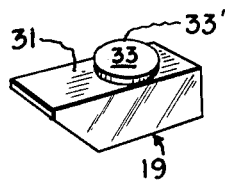
FIG. 3 is a perspective view of the refractometer prism.
Figure 1:
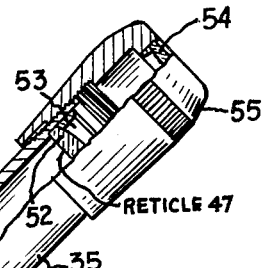
FIG. 1 is a side elevational sectional view of a refractometer constructed according to the present invention.

With reference now to the drawing, the refractometer comprises a housing 10 formed with an open bottom normally closed by a flat plate 11 which may be conveniently held in place by a plurality of bolts 12 which project through suitable openings in the flat plate 11 into threaded bolt holes formed in the housing 10. As indicated, the bolts 12 may be used to retain rubber anti-friction feet 13 in place.

The housing 10 includes a hood 14 which is fastened to the main portion of the housing by a pair of bolts 15. The housing further includes a mounting plate 16 which may either be integral with the housing or may be a separate plate disposed over an opening 17 and held in place by a plurality of bolts 18. The plate 16 is arranged for mounting a refracting prism 19 rigidly with respect to the housing 10. The housing 10 further includes an upwardly projecting portion 20 formed with an opening 21 therein which faces generally upwardly and toward the hood 14. The opening 21 is for the purpose of mounting a viewing tube, indicated generally by reference numeral 22, rigidly with respect to housing 10.

The housing 10 is formed with a horizontally extending flange 23 which is arranged for having a light bulb 24 mounted thereon. This arrangement directs light rays toward a sample, indicated by reference numeral 25, disposed on top of the refracting prism 19. In order to cut out undesirably directed light rays, a baffle plate 26 is provided at the open end 27 of the hood 14. The baffle plate 26 is held in place between a pair of flanges 28 and 29 by a spring clip 30 which is integrally formed on the baffle plate 26.

The refracting prism 19 has a flat top portion 31 which is cemented to the underside 32 of the refracting prism mounting plate 16 in order to provide a rigid and secure bond between the refracting prism and the mounting plate. The refracting prism is preferably formed with a generally cylindrical flat-topped button-shaped portion 33 which projects from the flat top portion 31 and extends through an opening 34 formed in the refracting prism mounting plate 16. Thus, a top 33' of the button-shaped portion 33 of refracting prism 19 is adapted to directly receive the samples of material to be examined thereon.

The viewing tube 22 comprises a pair of concentrically disposed tubes 35 and 36. The tube 36 is formed with a collar 37 adapted to seat against the top of opening 21 and the tube 36 is cemented in place within the housing 10 around the periphery of opening 21. The inner tube 35 is held in fixed relation with respect to the mounting tube 36 by means of a pair of set screws 38 at the lower end of the outer tube 36 and an objective mirror mounting member 39 is disposed concentrically around the outer tube 36. The member 39 is fixed with respect to the outer tube 36 by means of a plurality of set screws 40. The member 39 is formed with a pair of arm portions 41 which extend downwardly and pivotally mount an objective concave mirror 42 at pivots 43. The concave mirror 42 is mounted by means of a ring shaped member 44 which is provided with an actuating arm 45 that extends generally horizontally and is provided with an adjusting screw 46 at its opposite end.

In order to angularly adjust the mirror 43 so that light rays directed at grazing incidence to a sample 25 by the light bulb 24 will be focused to form an image in an image plane disposed at a reticle 47, an adjusting eccentric 48 is provided. The eccentric 48 is pivotally mounted on a shaft 49 which extends through the mounting housing 10 and is controlled by a manual adjusting button 49'. A spring 50 having one end looped over mounting shaft 49 and its other end looped under a projection 51 on lever 45 functions to retain the adjusting screw 46 in abutment with the eccentric 48.

Figure 2:
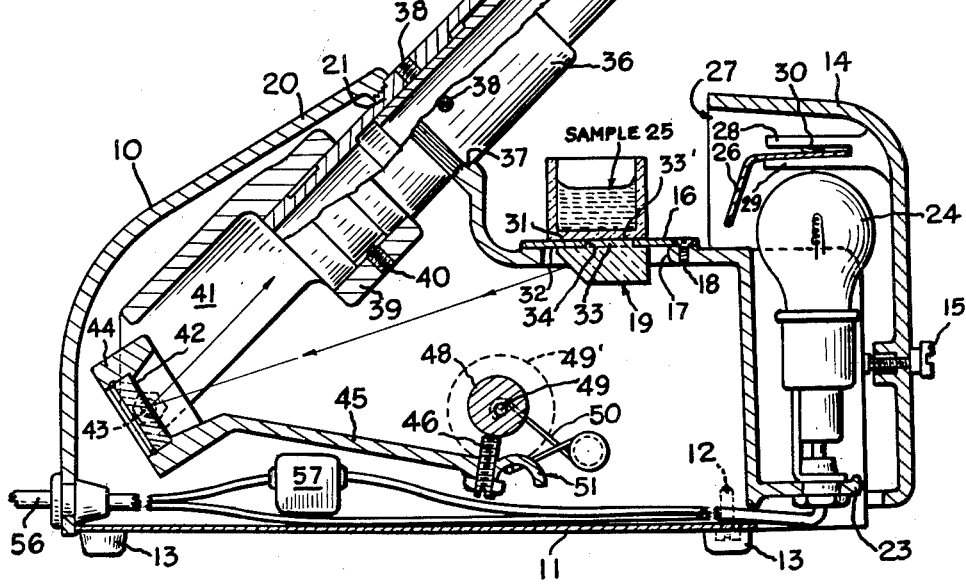
FIG. 2 is an enlarged view illustrating the ocular reticle utilized in the refractometer, shown in FIG. 1.
Figure 2:
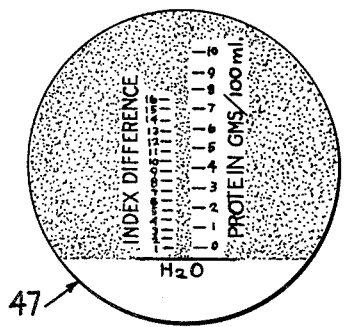

Mounted within the upper end of the viewing tube 22 is an ocular system comprising the reticle 47 consisting of scales, as shown in FIG. 2, marked upon a substantially plano surface of a lens 52. The reticle 47 is disposed at the image plane for the objective reflecting mirror 41 and is held in place by conventional means comprising a ring 53. The ocular system further includes a magnifying lens 54 disposed at the upper end of a sleeve member 55, the latter being threaded onto the upper end of the viewing tube 35.

An electrical conducting cord 56 leads into the housing 10 and one lead is provided with a manual switch 57 for controlling the operation of lamp 24.

In the operation of the refractometer disclosed herein, it is primarily intended that the refractometer will be used for determining the amount of protein in blood serum. In order to compensate for temperature changes which may occur in the room in which the refractometer is used, a cuvette of water is first used as the sample and the electric light 24 is turned on to cause light rays to be directed at grazing incidence to the sample of water. The rays are refracted by the water sample and reflected by the objective mirror 42 to focus at an image plane coincident with the plane in which reticle 47 is disposed. The adjusting shaft 49 is turned to bring the shadow cast by the rays into coincidence with the line marked $H_2O$ on the reticle 47. This has the effect of calibrating the instrument for the temperature conditions prevailing in the place where the refractometer is being utilized, it being assumed that the water disposed in the cuvette is representative of such temperature. Thereafter, the sample of blood serum may be placed in a cuvette and placed on top of the refracting prism 19 so that the light rays may be directed at grazing incidence thereto. The light rays emerging from the sample are then focused by the reflecting objective mirror 42 to form an image at the image plane in which reticle 47 lies. The shadow cast across the reticle may be read on the reticle scale either in terms of grams of protein per 100 ml. or as a difference in refractive index between protein and water.

The refractometer comprising the present invention is therefore readily compensated for temperature conditions which makes the refractometer much simpler and easier to use. The overall design and neat appearance of the present refractometer also contributes to its utility. It is contemplated that changes and modifications may be made in the present invention without departing from the spirit or scope thereof.

What is claimed is:

1. A refractometer comprising a housing, a refracting prism rigidly mounted in said housing and adapted for receiving thereon samples of materials to be examined, a light source for directing light rays at grazing incidence to a sample of material disposed on said prism, a concave reflecting surface having a spherical zone for bringing rays of light emerging from the sample to a focus to produce an image at an image plane, an ocular lens system having a calibrated reticle scale disposed in said image plane and a magnifying lens in optical alignment therewith, adjusting means for movably mounting said concave reflecting surface for positioning said image relative to said reticle scale, said calibrated reticle scale and said adjusting means together being effective to compensate for temperature conditions whereby a direct reading of refractive index with reference to a known sample is indicated.

2. A refractometer comprising a housing, a refracting prism rigidly mounted in said housing and adapted for receiving thereon samples of materials to be examined, a light source for directing light rays at grazing incidence to a sample of material disposed on said prism, a concave spherically surfaced optical imaging device for bringing rays of light emerging from the sample to a focus to produce an image at an image plane, an ocular lens system having a calibrated reticle scale disposed substantially in said image plane and a magnifying lens in optical alignment therewith, means pivotally mounting said concave spherically surfaced optical imaging device, manually movable adjusting means for pivotally positioning said imaging device to thereby adjust said image relative to said reticle scale, said calibrated reticle scale and said adjusting means together being effective to compensate for temperature conditions whereby a direct reading of refractive index with reference to a known sample is indicated.

3. A refractometer comprising a housing, a refracting prism rigidly mounted in an opening in the top of said housing and adapted for receiving thereon samples of materials to be examined, a light source disposed within said housing and effective to direct light rays at grazing incidence to a sample of material disposed on said prism, a viewing tube disposed in said housing and projecting upwardly therefrom at an acute angle and across said prism, said viewing tube including a spherically surfaced mirror for bringing rays of light emerging from the sample to a focus to thereby produce an image at an image plane disposed within said viewing tube, said viewing tube further including an ocular system comprising a calibrated reticle scale disposed substantially in said image plane and a magnifying lens in optical alignment therewith, adjusting means for positioning said mirror in order to adjust said image relative to said reticle scale, said calibrated reticle scale and said adjusting means together being effective to compensate for temperature conditions whereby a direct reading of refractive index with reference to a known sample is indicated.

4. A refractometer comprising a housing, a refracting prism rigidly mounted in an opening in the top of said housing and adapted for receiving thereon samples of materials to be examined, a light source disposed within said housing and having a baffle associated therewith for causing light rays to be directed at grazing incidence to a sample of material disposed on said prism, a viewing tube disposed in said housing and projecting upwardly therefrom at an acute angle and across said prism, said viewing tube including a spherically surfaced mirror pivotally mounted with respect thereto for reflecting rays of light emerging from the sample and bringing them to a focus and thereby produce an image at an image plane disposed within said viewing tube, said viewing tube further including an ocular system comprising a calibrated reticle scale disposed in said image plane and a magnifying lens in optical alignment therewith, manually movable adjusting means for pivotally positioning said spherical mirror with respect to said viewing tube for thereby adjustably positioning said image relative to said reticle scale, said calibrated reticle scale and said adjusting means together being effective to compensate for temperature conditions whereby a direct reading of refractive index with reference to a known sample is indicated.

5. A refractometer comprising a housing, means forming a hood projecting generally upwardly from one end of said housing and opening toward the other end of said housing, a viewing tube, means defining an upwardly projecting portion at the other end of said housing and having an opening facing generally upwardly and toward said hood for securing said viewing tube therein, a refracting prism rigidly mounted in said housing between said hood and said upwardly projecting portion and adapted for receiving thereon samples of materials to be examined, a light source disposed beneath said hood for directing light rays at grazing incidence to a sample of material disposed on said prism, said viewing tube having a spherically surfaced concave mirror pivotally mounted with respect thereto for reflecting rays of light emerging from the sample and bringing them to a focus to provide an image at an image plane disposed within the viewing tube, said viewing tube further including an ocular system comprising a calibrated reticle scale disposed substantially in said image plane and a magnifying lens in optical alignment therewith, an actuating arm carried by said mirror, manually movable adjusting means cooperable with said arm for positioning said mirror with respect to said viewing tube to adjust said image relative to said reticle scale, said calibrated reticle scale and said adjusting means together being effective to compensate for temperature conditions whereby a direct reading of refractive index with reference to a known sample is indicated.

6. A refractometer comprising a housing, means defining an opening in the top of said housing, a refracting prism having a generally flat top cemented to the underside of the top of said housing, said prism being formed with a substantially flat-topped button-shaped portion projecting from said flat top and extending through said opening in said housing for receiving thereon a sample of material to be examined, a light source for directing light rays at grazing incidence to said sample of material disposed on said prism, a viewing tube disposed in said housing and including a spherically surfaced mirror for bringing rays of light emerging from the sample to a focus to thereby produce an image at an image plane disposed within said viewing tube, said viewing tube further including an ocular system comprising a calibrated reticle scale disposed substantially in said image plane and a magnifying lens in optical alignment therewith, adjusting means for positioning said mirror in order to adjust said image relative to said reticle scale, said calibrated reticle scale and said adjusting means together being effective to compensate for temperature conditions whereby a direct reading of refractive index with reference to a known sample is indicated.

7. A refractometer comprising a housing, means forming a hood projecting generally upwardly from one end of said housing and opening toward the other end of said housing, a viewing tube, means defining an upwardly projecting portion at the other end of said housing and having an opening facing generally upwardly and toward said hood for receiving said viewing tube therein, means defining an upwardly facing opening in the top of said housing, a refracting prism having a generally flat top cemented to the underside of the top of said housing, said prism being formed with a flat-topped button-shaped portion projecting from said flat top and extending through said upwardly facing opening in said housing for receiving thereon a sample of material to be examined, a light source disposed beneath said hood for directing light rays at grazing incidence to a sample of material disposed on said prism, said viewing tube having a spherically surfaced concave mirror pivotally mounted with respect thereto for reflecting rays of light emerging from the sample and bringing them to a focus to provide an image at an image plane disposed within the viewing tube, said viewing tube further including an ocular system comprising a calibrated reticle scale disposed substantially in said image plane and a magnifying lens in optical alignment therewith, an actuating arm carried by said mirror, manually movable adjusting means cooperable with said arm for positioning said mirror with respect to said viewing tube to adjust said image relative to said reticle scale, said calibrated reticle scale and said adjusting means together being effective to compensate for temperature conditions whereby a direct reading of refractive index with reference to a known sample is indicated.

References Cited in the file of this patent
UNITED STATES PATENTS

| | | |
|---|---|---|
| 1,770,355 | Doi | July 8, 1930 |
| 2,633,052 | Vieweg | Mar. 31, 1953 |
| 2,966,091 | Goldberg | Dec. 27, 1960 |

FOREIGN PATENTS

| | | |
|---|---|---|
| 9,308 | Great Britain | of 1899 |
| 690,268 | Great Britain | Apr. 15, 1953 |

OTHER REFERENCES

"Automatic Recording Reflectometer for Measuring Diffuse Reflectance in the Visible and Infrared Regions," Derksen et al., Journal of the Optical Society of America, vol. 47, No. 11, November 1957; page 995 relied upon.